United States Patent
Yang et al.

(10) Patent No.: US 10,133,390 B2
(45) Date of Patent: Nov. 20, 2018

(54) PIXEL CIRCUIT, DRIVING METHOD THEREOF, SUBSTRATE, DISPLAY PANEL AND ELECTRONIC DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Hailin Xue, Beijing (CN); Xiaochuan Chen, Beijing (CN); Haisheng Wang, Beijing (CN); Yingming Liu, Beijing (CN); Xiaoliang Ding, Beijing (CN); Weijie Zhao, Beijing (CN); Changfeng Li, Beijing (CN); Pengpeng Wang, Beijing (CN); Wei Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/556,958

(22) PCT Filed: Jan. 19, 2017

(86) PCT No.: PCT/CN2017/071642
§ 371 (c)(1),
(2) Date: Sep. 8, 2017

(87) PCT Pub. No.: WO2017/197920
PCT Pub. Date: Nov. 23, 2017

(65) Prior Publication Data
US 2018/0095579 A1    Apr. 5, 2018

(30) Foreign Application Priority Data

May 19, 2016    (CN) .......................... 2016 1 0333690

(51) Int. Cl.
*G06F 3/041*    (2006.01)
*G06F 3/044*    (2006.01)

(52) U.S. Cl.
CPC ............ *G06F 3/0414* (2013.01); *G06F 3/044* (2013.01); *G06F 3/0412* (2013.01); *G06F 2203/04112* (2013.01); *G09G 2310/0278* (2013.01)

(58) Field of Classification Search
CPC ...... G06F 3/0414; G06F 3/0412; G06F 3/044; G06F 2203/04112; G09G 2310/0278
See application file for complete search history.

(56) References Cited

U.S. PATENT DOCUMENTS 6,064,053 A  *  5/2000  Chi ..................... H01L 27/0635
                                                    250/208.1
9,727,186 B2 *  8/2017  Yang ....................... G06F 3/044
(Continued)

FOREIGN PATENT DOCUMENTS

CN    101101525 A    1/2008
CN    101738765 A    6/2010
(Continued)

OTHER PUBLICATIONS

PCT (CN) International Search Report, Application No. PCT/CN2017/071642, dated Apr. 14, 2017, 4 pgs.
(Continued)

*Primary Examiner* — Afroza Chowdhury
(74) *Attorney, Agent, or Firm* — Armstrong Teasdale LLP

(57) ABSTRACT

A pixel circuit, a driving method thereof, a substrate including the pixel circuit, a display panel, and an electronic device are disclosed. The pixel circuit includes a pixel unit and a
(Continued)

pressure sensing unit. The pixel unit is connected to a scan line and a data line, and is configured to write in an image signal provided through the data line according to a signal provided through the scan line. The pressure sensing unit is connected to the scan line, and includes a detection electrode, a reference module, an amplification module, a reset module, a switch module, and a signal reading line.

20 Claims, 4 Drawing Sheets

(56) References Cited

U.S. PATENT DOCUMENTS

| | | | | |
|---|---|---|---|---|
| 2012/0206664 A1* | 8/2012 | Brown | ............... | G06F 3/0412 349/12 |
| 2015/0041628 A1* | 2/2015 | Goh | ............... | G01J 1/46 250/214 A |
| 2016/0216800 A1* | 7/2016 | Cho | ............... | G06F 3/044 |
| 2016/0240132 A1* | 8/2016 | Takahiro | ............... | G09G 3/325 |
| 2016/0246409 A1* | 8/2016 | Yang | ............... | G06F 3/0412 |
| 2017/0031485 A1* | 2/2017 | Kim | ............... | G06F 3/0412 |
| 2017/0068349 A1* | 3/2017 | Kim | ............... | G06F 3/044 |

FOREIGN PATENT DOCUMENTS

| | | |
|---|---|---|
| CN | 103208255 A | 7/2013 |
| CN | 104091563 A | 10/2014 |
| CN | 106020542 A | 10/2016 |

OTHER PUBLICATIONS

PCT (CN) Written Opinion, Application No. PCT/CN2017/071642, dated Apr. 14, 2017, 10 pgs. with English translation.

* cited by examiner

PIXEL CIRCUIT, DRIVING METHOD THEREOF, SUBSTRATE, DISPLAY PANEL AND ELECTRONIC DEVICE

CROSS REFERENCE TO RELATED APPLICATIONS

This patent application is a National Stage Entry of PCT/CN2017/071642 filed on Jan. 19, 2017, which claims the benefit and priority of Chinese Patent Application No. 201610333690.1 filed on May 19, 2016, the disclosures of which are incorporated herein by reference in their entirety as part of the present application.

BACKGROUND

The present disclosure relates to touch display technology, and particularly relates to a pixel circuit and a driving method thereof, a substrate, a display panel, and an electronic device.

Pressure sensing technology is a kind of technology which senses an external pressure and further measures the pressure. Such the technology has been widely used in industrial control field, medical field, and like. In recent years, in the field of display technology, it has been proposed and developed to apply the pressure sensing technology to a display device to implement a touch control.

Generally, a pressure sensing mechanism may be provided in a backlight portion of a display device (e.g., a liquid crystal display) or in a middle frame portion of a mobile device (e.g., a mobile phone, a tablet computer) to implement the touch control. However, this requires changing the structure of the display. Further, there may be a great installation tolerance when the pressure sensing mechanism is installed into the display device, which may result in a reduced accuracy of the pressure sensing.

BRIEF DESCRIPTION

Exemplary embodiments of the present disclosure provide a pixel circuit and a driving method thereof, a substrate, a display panel, and an electronic device, which can integrate a pressure sensing function into the pixel circuit and thus implement the pressure sensing inside a liquid crystal display device.

A first aspect of the present disclosure provides a pixel circuit, which includes a pixel unit and a pressure sensing unit. The pixel unit is connected to a scan line and a data line, and is configured to write in an image signal provided through the data line according to a signal provided through the scan line. The pressure sensing unit is connected to the scan line, and includes a detection electrode, a reference module, an amplification module, a reset module, a switch module, and a signal reading line. The detection electrode is configured to detect a pressing by a touch object to generate a detection capacitance with the touch object. The reference module is coupled with the detection electrode, and is configured to provide a reference voltage. The amplification module is coupled with the reference module and the detection electrode, and is configured to output an amplified current signal according to an input voltage signal, wherein the input voltage signal depends on the reference voltage and the detection capacitance. The reset module is configured to reset the input voltage signal of the amplification module according to the signal provided through the scan line. The switch module is coupled with the amplification module, and is configured to switch on or off according to a control signal. The signal reading line is coupled with the switch module, and is configured to read the current signal output by the amplification module via the switch module.

In an embodiment of the present disclosure, the reference module may include a capacitor, one end of the capacitor is coupled with a first control voltage terminal and the other end is coupled with the detection electrode and the amplification module.

In an embodiment of the present disclosure, the amplification module includes a first transistor, a control electrode of the first transistor is coupled with the reference module, a first electrode of the first transistor is coupled with the switch module, and a second electrode of the first transistor is coupled with a second control voltage terminal.

In an embodiment of the present disclosure, the reset module includes a second transistor, a control electrode of the second transistor is coupled with the scan line, a first electrode of the second transistor is coupled with the amplification module, and a second electrode of the second transistor is coupled with a second control voltage terminal.

In an embodiment of the present disclosure, the switch module includes a third transistor, a control electrode of the third transistor is coupled with a control signal terminal, a first electrode of the third transistor is coupled with the signal reading line, and a second electrode of the third transistor is coupled with an output end of the amplification module.

In an embodiment of the present disclosure, transistors of the pixel unit and transistors of the pressure sensing unit are N-type transistors or P-type transistors.

A second aspect of the present disclosure provides a method for driving the pixel circuit as above. In the method, in a first time period, the pixel unit is enabled, and the reset module in the pressure sensing unit is caused to reset the input voltage signal of the amplification module. In a second time period, the pixel unit is disabled, and the switch module in the pressure sensing unit switches on, and the output current signal of the amplification module is read by the signal reading line.

In an embodiment of the present disclosure, the transistor of the pixel unit and the transistors of the pressure sensing unit are N-type transistors. In the first time period, the scan line is inputted with a high level signal, and the control signal is a low level signal, so that the input signal voltage of the amplification module depends on the reference voltage provided by the reference module. In the second time period, the scan line is inputted with the low level signal, and the control signal is the high level signal, so that the input signal voltage of the amplification module depends on the detection capacitance between the detection electrode in the pressure sensing unit and the touch object.

In an embodiment of the present disclosure, the transistor of the pixel unit and the transistors of the pressure sensing unit are P-type transistors. In the first time period, the scan line is inputted with the low level signal, and the control signal is the high level signal, so that the input signal voltage of the amplification module depends on the reference voltage provided by the reference module. In the second time period, the scan line is inputted with the high level signal, and the control signal is the low level signal, so that the input signal voltage of the amplification module depends on the detection capacitance between the detection electrode in the pressure sensing unit and the touch object.

A third aspect of the present disclosure provides a substrate, which includes at least one pixel circuit as above.

In an embodiment of the present disclosure, in the substrate, the at least one pixel circuit is arranged at a certain interval.

In an embodiment of the present disclosure, the substrate further includes a detection circuit coupled with the at least one pixel circuit, and configured to determine a position pressed by the touch object and a pressure according to the output current signal from the at least one pixel circuit.

A fourth aspect of the present disclosure provides a display panel, which includes the substrate as above.

A fifth aspect of the present disclosure provides an electronic device, which includes the display panel as above.

BRIEF DESCRIPTION OF THE DRAWINGS

In order to more clearly illustrate the technical solutions of the embodiments of the present disclosure, the drawings to be used in the description of the embodiments will be briefly described below. It will be appreciated that the drawings described below are only a few of the embodiments of the present disclosure, rather than limit the present disclosure.

DETAILED DESCRIPTION

In order to make the technical solutions and advantages of the embodiments of the present disclosure clearer, the technical solutions of the embodiments of the present disclosure will be described below clearly and completely in conjunction with the accompanying drawings. It is obvious that the described embodiments are merely part but not all of the embodiments of the present disclosure. All other embodiments obtained by those skilled in the art based on the described embodiments of the present disclosure without the need for creative labor are also within the scope of protection of the present disclosure.

Figure 1:
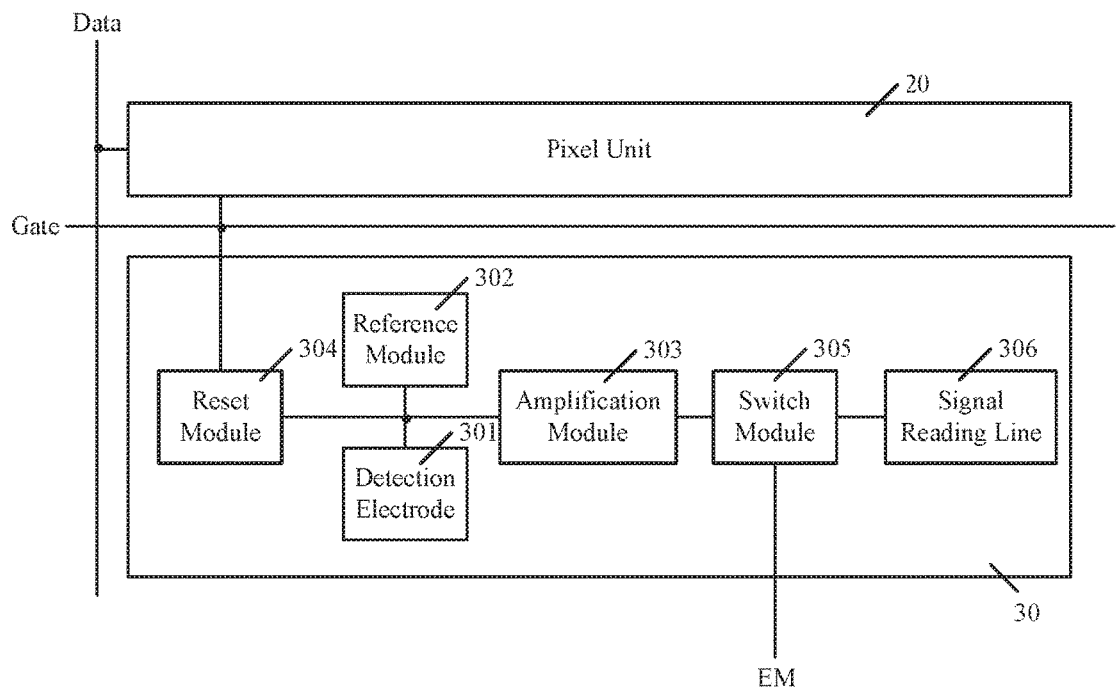
FIG. 1 is a schematic block diagram of the pixel circuit according to an embodiment of the present disclosure.

FIG. 1 shows a schematic block diagram of the pixel circuit according to an embodiment of the present disclosure. As shown in FIG. 1, the pixel circuit may include a pixel unit 20 and a pressure sensing unit 30. The pixel unit 20 provides an image display function, and the pressure sensing unit 30 may sense a pressure from an external touch object (e.g. a finger).

The pixel unit 20 may be a conventional pixel unit for a liquid crystal display device. The pixel unit 20 is connected with a scan line Gate and a data line Data, and writes in an image signal provided through the data line Data under the control of a scan signal provided through the scan line Gate.

The pressure sensing unit 30 is connected with the scan line Gate. In some embodiments of the present disclosure, the pixel unit 20 and the pressure sensing unit 30 are connected to the same scan line Gate to implement the image display function and the pressure sensing function by time multiplexing the scan signal. Thus, the pixel circuit may alternately operate in a display mode and a pressure sensing mode.

As shown in FIG. 1, the pressure sensing unit 30 may include a detection electrode 301, a reference module 302, an amplification module 303, a reset module 304, a switch module 305, and a signal reading line 306. The detection electrode 301 may detect the pressing by the external touch object (e.g. a finger) to generate a detection capacitance C1 with the touch object. The detection capacitance C1 is associated with the magnitude of the pressure of the pressing. Generally, the greater the pressure of the pressing is, the greater the detection capacitance C1 is. The reference module 302 is coupled with the detection electrode 301 to provide a reference voltage. As described later in detail, the reference voltage may affect the input voltage signal of the amplification module 303.

The amplification module 303 may be coupled with the detection electrode 301 and the reference module 302, and output the amplified current signal according to the input voltage signal. In an embodiment, the input voltage signal of the amplification module 303 may depend on the reference voltage provided by the reference module 302 and the detection capacitance C1. Specifically, in the display mode of the pixel circuit, the input voltage signal of the amplification module 303 is associated with the reference voltage. In the pressure sensing mode of the pixel circuit, the input voltage signal of the amplification module 303 is affected by the detection capacitance C1. Thus, in the pressure sensing mode, the magnitude of input voltage signal is associated with the detection capacitance C1. Further, in the amplification module 303, the output current signal is proportional to the input voltage signal. Thus, in the pressure sensing unit 30, the magnitude of the output current signal can reflect the magnitude of the pressure of the pressing by the touch object. Thus, it is possible to determine the magnitude of the pressure of the pressing by the touch object upon the detection of the magnitude of the output current signal.

The reset module 304 may be connected to the scan line Gate, and reset the input voltage signal of the amplification module 303 according to the scan signal. The switch module 305 may be coupled with the amplification module 303, and may switch on or off according to a control signal EM, so that the current signal outputted by the amplification module 303 can be read. In some embodiments of the present disclosure, the control signal EM may cause the switch module 305 to switch on in the pressure sensing mode, and may cause the switch module 305 to switch off in the display mode. The signal reading line 306 may be coupled with the switch module 305 and read the current signal output from the amplification module 303 via the switch module 305. In a case where the switch module 305 is ON, the signal reading line 306 can read the current signal from the amplification module 303.

Figure 2:
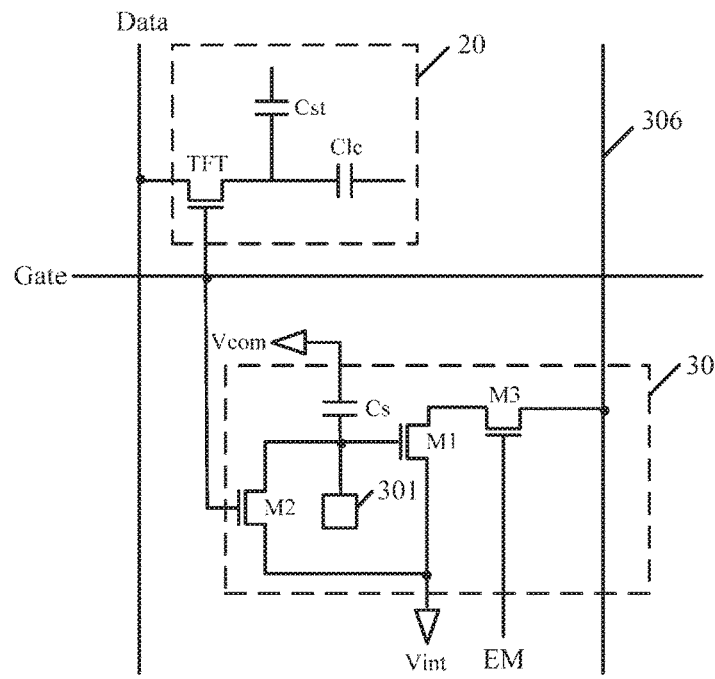
FIG. 2 is a schematic circuit diagram of the pixel circuit according to an embodiment of the present disclosure.

FIG. 2 shows a schematic circuit diagram of the pixel circuit according to an embodiment of the present disclosure. In FIG. 2, the similar reference numbers may be used for those parts that are same as those in the previous embodiment.

As shown in FIG. 2, the pixel unit 20 may include a thin film transistor TFT as a switch element, a liquid crystal capacitor C1c and a storage capacitor Cst. A control electrode of the thin film transistor TFT is connected with the scan line Gate, a first electrode is connected with the data line Data, and a second electrode is connected with the liquid crystal capacitor C1c and the storage capacitor Cst. In an embodiment, the thin film transistor TFT is an N-type thin film transistor. The control electrode of the TFT is a gate electrode, the first electrode is a source electrode, and the second electrode is a drain electrode. When the scan signal is a high level signal, the thin film transistor TFT is ON, and an image signal provided through the data line Data is written in the pixel unit 20. At this time, the pixel circuit is in the display mode. When the scan signal is a low level signal, the thin film transistor TFT is OFF, and the pixel unit 20 is disabled. At this time, the pixel circuit is in the pressure sensing mode. Those ordinary skilled in the art will appreciate that the thin film transistor TFT may also be a P-type thin film transistor. In such the case, when the scan signal is a low level signal, the thin film transistor TFT is ON, and the pixel unit 20 is enabled.

In the pressure sensing unit 30, the reference module 302 may include a capacitor Cs. One end of the capacitor Cs is connected to a first control voltage terminal. The first control voltage terminal is for example a common voltage terminal Vcom. The other end of the capacitor Cs is connected to the detection electrode 301 and an input end of the amplification module 303. The capacitor Cs may provide a reference voltage after being charged, and the initial voltage at the input end of the amplification module 303 can be determined.

The amplification module 303 may include a first transistor M1. A control electrode of the first transistor M1 is connected with the capacitor Cs and the detection electrode 301, a first electrode of the first transistor M1 is connected with the switch module 305, and a second electrode of the first transistor M1 is connected with a second control voltage terminal Vint. In an embodiment of the present disclosure, the type of the first transistor M1 may be same as that of the thin film transistor TFT of the pixel unit 20, for example, N type. In such the case, the control electrode of the first transistor M1 is a gate electrode, the first electrode is a drain electrode, and the second electrode is a source electrode. In order to achieve the amplification function, the first transistor M1 is set to work in an amplified state. In other words, the first transistor M1 is set to work in a linear region or a saturated region. In this case, the output drain current (equivalent to "the output current signal") of the first transistor M1 is proportional to the input gate voltage (equivalent to "the input voltage signal"). By adjusting the capacitor Cs, the initial voltage of the control electrode of the first transistor M1 can be controlled, so that the first transistor M1 can be ON to generate the drain current.

The reset module 304 may include a second transistor M2. A control electrode of the second transistor M2 is connected with the scan line Gate, a first electrode of the second transistor M2 is connected with the input end of the amplification module 302 (i.e., the control electrode of the first transistor M1 in the embodiment), and a second electrode of the second transistor M2 is connected with the second control voltage terminal Vint. In an embodiment of the present disclosure, the type of the second transistor M2 is same as that of the thin film transistor TFT of the pixel unit 20, for example, N type. In this case, the control electrode of the second transistor M2 is a gate electrode, the first electrode is a drain electrode, and the second electrode is a source electrode. When the scan signal is the high level signal, the second transistor M2 is ON. At this time, the capacitor Cs is charged to the reference voltage. Accordingly, the voltage of the control electrode of the first transistor M1 is reset to the initial voltage. When the scan signal is the low level signal, the second transistor M2 is OFF.

The switch module 305 may include a third transistor M3. A control electrode of the third transistor M3 is connected with the control signal terminal EM, a first electrode of the third transistor M3 is connected with the signal reading line 306, and a second electrode of the third transistor M3 is connected with the output end of the amplification module 303 (i.e., the first electrode of the first transistor M1 in the embodiment). Similarly, the type of the third transistor M3 may be same as that of the thin film transistor TFT of the pixel unit 20, for example, N type. In this case, the control electrode of the third transistor M3 is a gate electrode, the first electrode is a drain electrode, and the second electrode is a source electrode. When the control signal from the control signal terminal EM is the high level signal, the third transistor M3 is ON, and the output drain current of the first transistor M1 can be read by the signal reading line 306. When the control signal is the low level signal, the third transistor M3 is OFF, and the output drain current of the first transistor M1 cannot be read. In an embodiment of the present disclosure, the time period for the high level of the control signal immediately follows the time period for the high level of the scan signal.

Although in the above description, the transistors of the pixel unit 20 and the pressure sensing unit 30 are N-type transistors, those ordinary skilled in the art will appreciate that the transistors of the pixel unit 20 and the pressure sensing unit 30 may be P-type transistors. In this case, the scan signal, the control signal, the voltage of the first voltage control terminal, and the voltage of the second voltage control terminal are opposite. Alternatively, in the embodiment of the present disclosure, the types of the transistors may not be defined.

The pixel circuit according to the embodiments of the present disclosure can integrate the display function and the pressure sensing function together, so as to avoid an installation error caused by installing the pressure sensing mechanism and improve the accuracy of the pressure sensing. Furthermore, since all the transistors of the pixel circuit are the same type of thin-film transistors, no additional manufacturing process may be added and thus the production cost can be reduced.

Figure 3A:
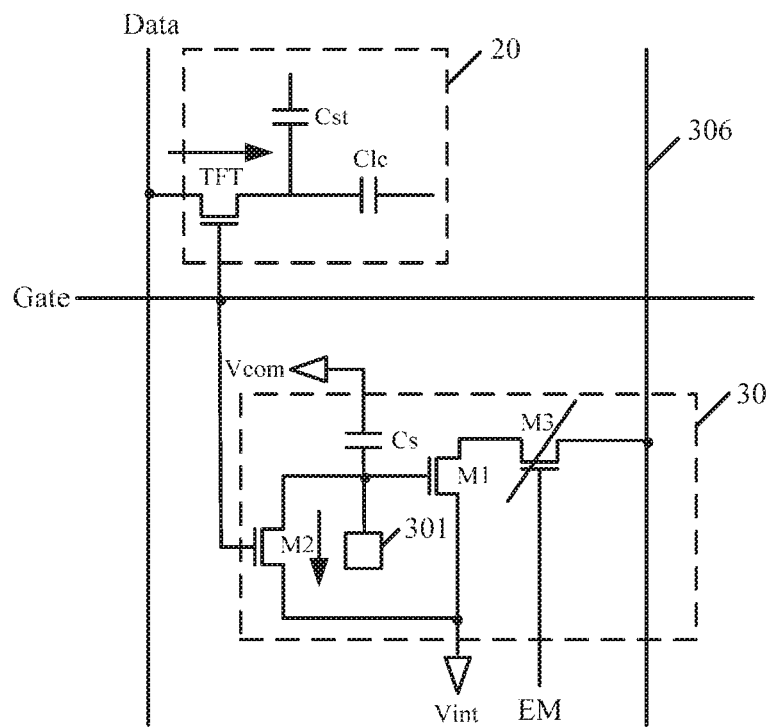
FIGS. 3A and 3B are diagrams illustrating the operation of the pixel circuit as shown in FIG. 2.
Figure 3B:
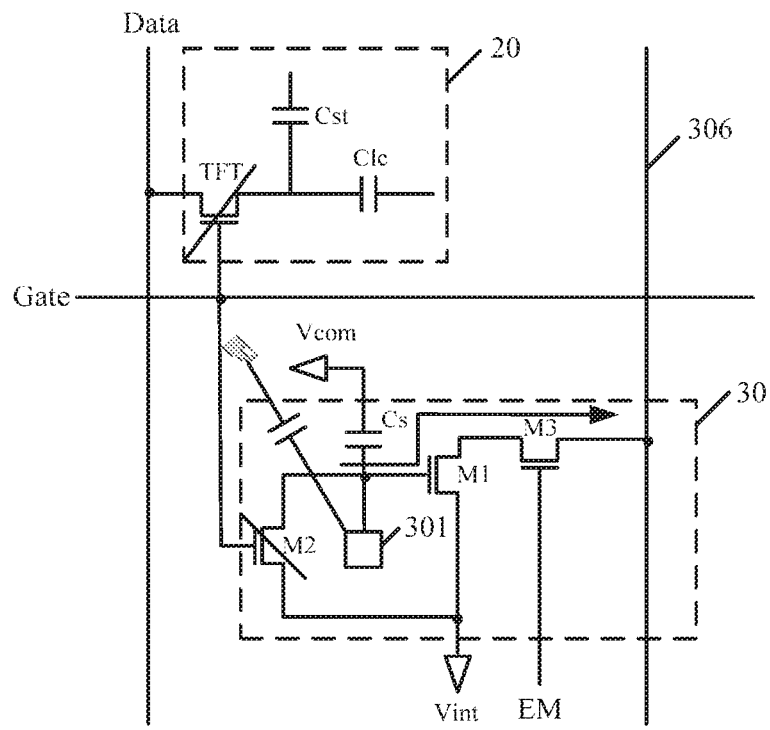

Next the operation of the pixel circuit as shown in FIG. 2 will be described in detail in conjunction with FIGS. 3A, 3B, and 4. As described above, the pixel circuit may operate alternately in the display mode and in the pressure sensing mode according to the scan signal. In the following description, it is assumed that all the transistors of the pixel circuit are N-type thin film transistors, the first control voltage terminal Vcom provides the high level voltage signal, and the second control voltage terminal Vint provides the low level voltage signal.

Figure 4:
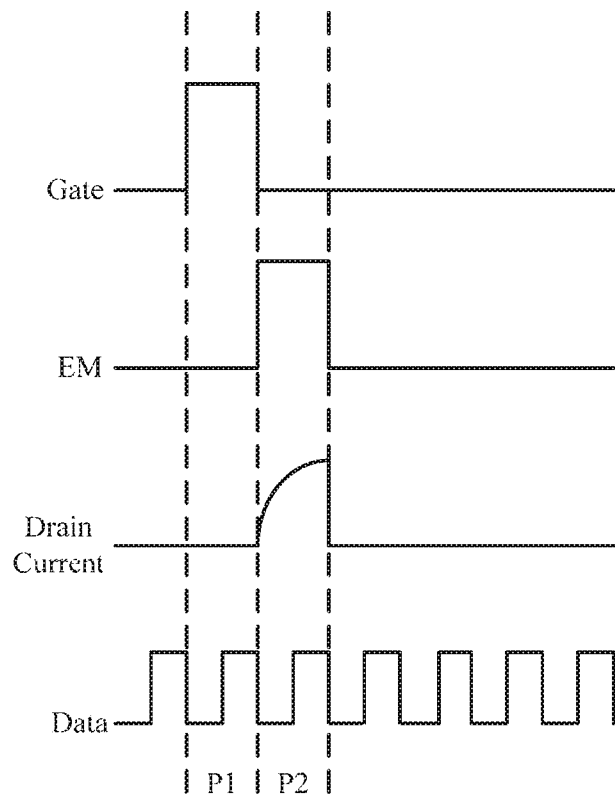
FIG. 4 is a timing diagram for the pixel circuit as shown in FIG. 2.

Referring to FIG. 4, in a first time period (P1), the scan line Gate provides the scan signal of high level, and the control signal terminal EM provides the control signal of low level. As shown in FIG. 3A, in this time period, the pixel unit 20 is enabled to display. The second transistor M2 is ON to charge the capacitor Cs to the reference voltage. The gate voltage of the first transistor M1 is reset to the initial voltage. The initial voltage depends on the reference voltage, and cause the first transistor M1 to switch on. The initial gate voltage of the first transistor M1 may be adjusted by adjusting the capacitance value of the capacitor Cs. At this time, the third transistor M3 is OFF, and the signal reading line 306 cannot read the drain current signal of the first transistor M1.

In a second time period (P2), the scan line Gate provides the scan signal of low level, and the control signal terminal EM provides the control signal of high level. As shown in FIG. 3B, in this time period, the pixel unit 20 is disabled.

The first transistor M1 remains ON, the second transistor M2 becomes OFF, and the third transistor M3 is ON. At this time, the signal reading line 306 may read the drain current signal of the first transistor M1. During this time period, if the touch object such as a finger presses the pixel circuit, the detection capacitance C1 is generated between the detection electrode 301 and the finger upon the detection electrode 301 detects the pressing of the finger. The detection capacitance C1 is proportional to the magnitude of the pressure of the pressing. As the detection capacitance C1 is generated between the finger and the detection electrode 301, the gate voltage of the first transistor M1 will be decreased. The gate voltage may depend on a ratio of the detection capacitance C1 to the capacitor Cs and a parasitic capacitance of the first transistor M1. The greater the detection capacitance C1 is, the smaller the gate voltage is. That is, the greater the pressing pressure is, the smaller the gate voltage of the first transistor M1 is, and accordingly, the smaller the drain current of the first transistor M1 is. By reading the drain current of the first transistor M1, it is possible to determine the pressure of the pressing, thereby realizing the touch control.

Furthermore, as the greater the detection capacitance C1 is, the lower the gate voltage of the first transistor M1 is, if the detection capacitance C1 is large enough, it may cause the first transistor M1 to switch off. In this case, the signal reading line 306 cannot read the drain current signal any more. In an embodiment of the present disclosure, the pressure of the pressing which may cause the first transistor M1 to switch off may be set to the maximum pressure value that the pixel circuit can sense.

Figure 5:
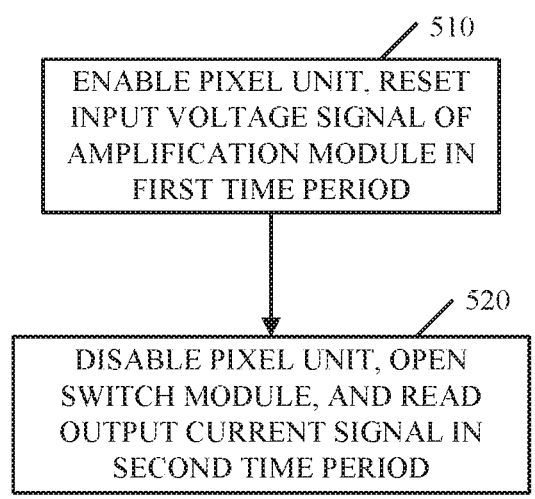
FIG. 5 is a schematic flowchart of the driving method for driving the pixel circuit according to an embodiment of the present disclosure.

FIG. 5 shows a schematic flowchart of the driving method for driving the pixel circuit according to an embodiment of the present disclosure. In this embodiment, the pixel circuit may be the pixel circuit as shown in FIG. 1 or 2.

As shown in FIG. 5, at step S510, in the first time period, the pixel circuit in the pixel unit is enabled, and the reset module in the pressure sensing unit is caused to reset the input voltage signal of the amplification module. During this time period, the pixel circuit operates in the display mode.

In the case that all the thin film transistors in the pixel circuit are N-type transistors, in the first time period, the scan line is inputted with the scan signal of high level, and the control signal is the low level signal. Thus, the pixel unit is enabled, and the image signal provided through the data line is written into the pixel unit for displaying. Furthermore, the reset module is initiated to reset the input signal voltage of the amplification module.

Those of ordinary skill in the art will appreciate that, in the case of P-type transistors, the corresponding scan signal and control signal will become the inverted signals.

Then, at step S520, in the second time period, the pixel unit is disabled, and the switch module in the pressure sensing unit is caused to switch on, the output current signal of the amplification module is read by the signal reading line. In this time period, the pixel circuit operates in the pressure sensing mode, and can sense the external pressure (e.g. from a finger).

In the case that all the thin film transistors in the pixel circuit are N-type transistors, in the second time period, the scan line is inputted with the scan signal of low level, and the control signal is the high level signal. Thus, the pixel unit is disabled, the second transistor is OFF, and the third transistor is ON, so that the signal reading line can read the output current signal of the amplification module.

Those of ordinary skill in the art will appreciate that, in the case of P-type transistors, the corresponding scan signal and control signal will become the inverted signals.

Figure 6:
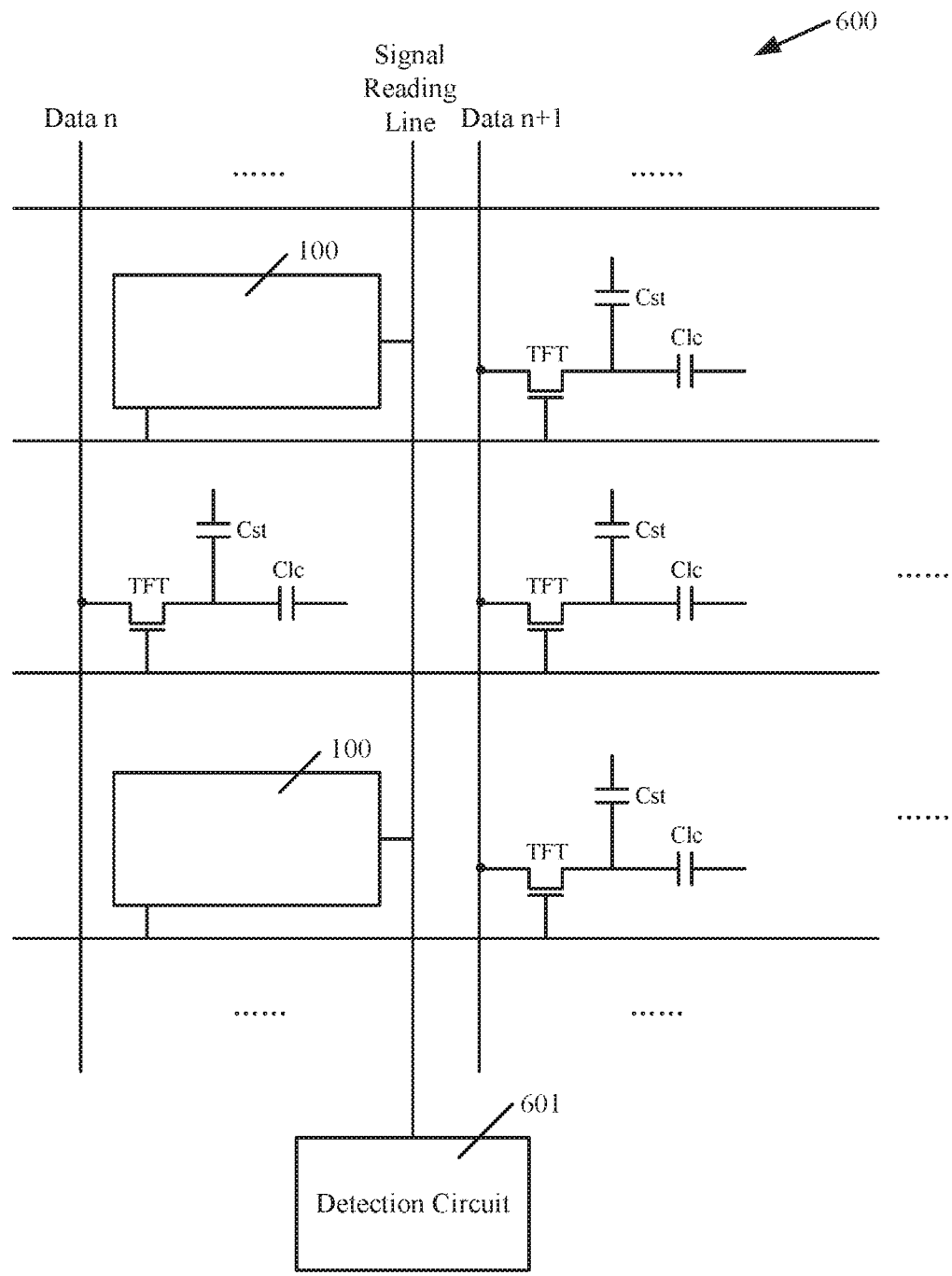
FIG. 6 is a diagram of an example of the substrate according to an embodiment of the present disclosure.

FIG. 6 shows a schematic diagram of an example of the substrate 600 according to an embodiment of the present disclosure. As shown in FIG. 6, the substrate 600 may include, in addition to the conventional pixel circuit without the pressure sensing function, at least one pixel circuit 100 as shown in FIG. 2 (the figure shows two pixel circuits, for example). The two pixel circuits 100 are arranged separately with one conventional pixel circuit interposed therebetween.

Of course, those of ordinary skill in the art will appreciate that the substrate may be structured as the pixel circuit with the pressure sensing function being arranged in each row and/or each column, or all the pixel circuits on the substrate have the pressure sensing function.

The substrate according to the embodiment of the present disclosure can provide different granularities for the pressure sensing by providing different numbers of pixel circuits with the pressure sensing function, and improve the sensing accuracy.

In addition, the substrate 600 may further include a detection circuit 601. The detection circuit 601 may be connected with the pixel circuit 100, and determine the position pressed by the touch object and the pressure based on the output current signal from the pixel circuit 100. The detection circuit 601 may detect the change in the output current signal from which pixel circuit to determine the position of the pixel circuit as the position of the pressing by the touch object. Furthermore, the detection circuit 601 may calculate, based on the output current signal, the input voltage signal, and further calculate the detection capacitance corresponding to the input voltage signal and the pressure corresponding to the detection capacitance.

The substrate 600 according to an embodiment of the present disclosure may be used as an array substrate of the display panel.

An embodiment of the present disclosure further provides an electronic device, wherein the electronic device may include the display panel as described above. The electronic device may be, for example, a liquid crystal display, a mobile phone, a smart phone, a laptop computer, a tablet computer, or a wearable electronic device etc.

The foregoing are only specific embodiments of the present disclosure, but the scope of protection of the present disclosure is not limited thereto, and any variation or substitution easily conceivable to those skilled in the art, within the technical scope disclosed in this disclosure, shall be covered by the scope of protection of the present disclosure. Accordingly, the scope of protection of the present disclosure should be based on the scope of protection of the appended claims.

What is claimed is:

1. A method for driving a pixel circuit, the pixel circuit comprising:
   a pixel unit connected to a scan line and a data line, and configured to write in an image signal provided through the data line according to a signal provided through the scan line; and
   a pressure sensing unit connected to the scan line and comprising:
      a detection electrode configured to detect pressure from a touch object to generate a detection capacitance associated with the touch object;
      a reference module coupled to the detection electrode and configured to provide a reference voltage;

an amplification module coupled to the reference module and the detection electrode and configured to output an amplified current signal according to an input voltage signal, wherein the input voltage signal depends on the reference voltage and the detection capacitance;

a reset module configured to reset the input voltage signal of the amplification module according to the signal provided through the scan line;

a switch module coupled to the amplification module and configured to switch on or off according to a control signal; and a signal reading line coupled to the switch module and configured to read the current signal output by the amplification module via the switch module, wherein the reference module comprises a capacitor, the amplification module comprises a first transistor, the reset module comprises a second transistor, and the switch module comprises a third transistor, the method comprising:

in a first time period, activating the pixel unit and causing the reset module in the pressure sensing unit to reset the input voltage signal of the amplification module; and in a second time period, disabling the pixel unit, causing the switch module in the pressure sensing unit to switch on, and reading the output current signal of the amplification module by the signal reading line.

2. The method according to claim 1, wherein transistors of the pixel unit and transistors of the pressure sensing unit are N-type transistors;

wherein in the first time period, the scan line is inputted with a high level signal, and the control signal is a low level signal, so that the input signal voltage of the amplification module depends on the reference voltage provided by the reference module; and wherein in the second time period, the scan line is inputted with the low level signal, and the control signal is the high level signal, so that the input signal voltage of the amplification module depends on the detection capacitance between the detection electrode in the pressure sensing unit and the touch object.

3. The method according to claim 1, wherein transistors in the pixel unit and transistors in the pressure sensing unit are P-type transistors;

wherein in the first time period, the scan line is inputted with a low level signal, and the control signal is a high level signal, so that the input signal voltage of the amplification module depends on the reference voltage provided by the reference module; and wherein in the second time period, the scan line is inputted with a high level signal, and the control signal is a low level signal, so that the input signal voltage of the amplification module depends on the detection capacitance between the detection electrode in the pressure sensing unit and the touch object.

4. A pixel circuit comprising:

a pixel unit connected to a scan line and a data line, and configured to write in an image signal provided through the data line according to a signal provided through the scan line; and a pressure sensing unit connected to the scan line and comprising:

a detection electrode configured to detect pressure from a touch object to generate a detection capacitance associated with the touch object;

a reference module coupled to the detection electrode and configured to provide a reference voltage;

an amplification module coupled to the reference module and the detection electrode and configured to output an amplified current signal according to an input voltage signal, wherein the input voltage signal depends on the reference voltage and the detection capacitance;

a reset module configured to reset the input voltage signal of the amplification module according to the signal provided through the scan line;

a switch module coupled to the amplification module and configured to switch on or off according to a control signal; and a signal reading line coupled to the switch module and configured to read the current signal output by the amplification module via the switch module, wherein the reference module comprises a capacitor, the amplification module comprises a first transistor, the reset module comprises a second transistor, and the switch module comprises a third transistor; and wherein the pixel circuit is configured to:

in a first time period, activate the pixel unit and cause the reset module in the pressure sensing unit to reset the input voltage signal of the amplification module; and in a second time period, disable the pixel unit, cause the switch module in the pressure sensing unit to switch on, and read the output current signal of the amplification module by the signal reading line.

5. The pixel circuit according to claim 4, wherein transistors of the pixel unit and transistors of the pressure sensing unit are N-type transistors; and wherein in the first time period, the scan line is inputted with a high level signal, and the control signal is a low level signal, so that the input signal voltage of the amplification module depends on the reference voltage provided by the reference module; and wherein in the second time period, the scan line is inputted with the low level signal, and the control signal is the high level signal, so that the input signal voltage of the amplification module depends on the detection capacitance between the detection electrode in the pressure sensing unit and the touch object.

6. The pixel circuit according to claim 4, wherein transistors in the pixel unit and transistors in the pressure sensing unit are P-type transistors; and wherein in the first time period, the scan line is inputted with a low level signal, and the control signal is a high level signal, so that the input signal voltage of the amplification module depends on the reference voltage provided by the reference module; and wherein in the second time period, the scan line is inputted with a high level signal, and the control signal is a low level signal, so that the input signal voltage of the amplification module depends on the detection capacitance between the detection electrode in the pressure sensing unit and the touch object.

7. The pixel circuit according to claim 4, wherein one end of the capacitor is coupled to a first control voltage terminal and the other end is coupled to the detection electrode and the amplification module.

8. The pixel circuit according to claim 4, wherein a control electrode of the first transistor is coupled to the reference module, wherein a first electrode of the first transistor is coupled to the switch module, and wherein a second electrode of the first transistor is coupled to a second control voltage terminal.

9. The pixel circuit according to claim 4, wherein a control electrode of the second transistor is coupled to the scan line, wherein a first electrode of the second transistor is coupled to the amplification module, and wherein a second electrode of the second transistor is coupled to a second control voltage terminal.

10. The pixel circuit according to claim 4, wherein a control electrode of the third transistor is coupled to a control signal terminal, wherein a first electrode of the third transistor is coupled to the signal reading line, and wherein a second electrode of the third transistor is coupled to an output end of the amplification module.

11. The pixel circuit according to claim 4, wherein transistors of the pixel unit and transistors of the pressure sensing unit are one of N-type transistors and P-type transistors.

12. A substrate comprising at least one pixel circuit according to claim 4.

13. The substrate according to claim 12, wherein the at least one pixel circuit is arranged at a predetermined interval.

14. The substrate according to claim 12, further comprising a detection circuit coupled to the at least one pixel circuit and configured to determine i) a position pressed by the touch object and ii) a pressure according to an output current signal from the at least one pixel circuit.

15. A display panel comprising the substrate according to claim 12.

16. An electronic device comprising the display panel according to claim 15.

17. The pixel circuit according to claim 7, wherein a control electrode of the first transistor is coupled to the reference module, wherein a first electrode of the first transistor is coupled to the switch module, and wherein a second electrode of the first transistor is coupled to a second control voltage terminal.

18. The pixel circuit according to claim 17, wherein a control electrode of the second transistor is coupled to the scan line, wherein a first electrode of the second transistor is coupled to the amplification module, and wherein a second electrode of the second transistor is coupled to a second control voltage terminal.

19. The pixel circuit according to claim 18, wherein a control electrode of the third transistor is coupled to a control signal terminal, wherein a first electrode of the third transistor is coupled to the signal reading line, and wherein a second electrode of the third transistor is coupled to an output end of the amplification module.

20. The pixel circuit according to claim 19, wherein transistors of the pixel unit and the transistors of the pressure sensing unit are one of N-type transistors and P-type transistors.

* * * * *